United States Patent
Fukuda (10) Patent No.: US 7,804,758 B2
(45) Date of Patent: Sep. 28, 2010

(54) HOLOGRAPHIC INFORMATION RECORDING/REPRODUCING APPARATUS

(75) Inventor: Atsunobu Fukuda, Oyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 421 days.

(21) Appl. No.: 12/016,087

(22) Filed: Jan. 17, 2008

(65) Prior Publication Data

US 2008/0186830 A1 Aug. 7, 2008

(30) Foreign Application Priority Data

Feb. 2, 2007 (JP) .............................. 2007-024496

(51) Int. Cl.
*G11B 7/00* (2006.01)
(52) U.S. Cl. .................. 369/103; 369/112.29
(58) Field of Classification Search ........................ None
See application file for complete search history.

(56) References Cited

U.S. PATENT DOCUMENTS

| 2007/0115523 A1* | 5/2007 | Matsumura et al. ........... 359/24 |
| 2008/0084593 A1 | 4/2008 | Horiguchi et al. .............. 359/22 |
| 2008/0094998 A1* | 4/2008 | Jeong et al. .................. 369/103 |
| 2009/0086605 A1* | 4/2009 | Ide et al. ...................... 369/103 |

OTHER PUBLICATIONS

Redmond, Ian, "The InPhase Professional Archive Drive OMA: Design and Function", Optical Data Storage Topical Meeting, 2006, pp. 3-5.

* cited by examiner

*Primary Examiner*—Jorge L Ortiz Criado
(74) *Attorney, Agent, or Firm*—Fitzpatrick, Cella, Harper & Scinto (57) ABSTRACT

An information recording/reproducing apparatus can suppress generation of stray light and prevent aggravation of the SN (signal to noise) ratio at the time of reproduction. If the angle of incidence of reference beam relative to the information recording medium (transmission-type disk 119 or reflection-type disk 213) at the time of recording is $\theta 1$, the angle of incidence of reference beam relative to the information recording medium at the time of reproduction is $\theta 2$ and the angle of incidence of reference beam reentering the information recording medium relative to the information recording medium at the time of reproduction is $\theta 3$, the angle of the galvano mirror for changing the angle of incidence of reference beam and the angle of the galvano mirror for reentering reference beam into the information recording medium are controlled so as to establish relationships of $\theta 1 \neq \theta 2$ and $\theta 1 = \theta 3$.

3 Claims, 10 Drawing Sheets

HOLOGRAPHIC INFORMATION RECORDING/REPRODUCING APPARATUS

BACKGROUND OF THE INVENTION

1. Field of the Invention

This invention relates to a holographic information recording/reproducing apparatus for recording information on and reproducing information from a holographic recording medium, utilizing holography.

2. Description of the Related Art

Holographic recording of utilizing holography for recording information on a recording medium is generally realized by laying signal beam that carries image information and reference beam one on the other in the inside of a recording medium and writing the interference fringes thereof on the recording medium. When reproducing the recorded information, the image information is reproduced by irradiating the recording medium with reference beam and causing diffraction to take place by means of the interference fringes.

Volume holography, digital volume holography in particular, has been developed in recent years for practical applications in order to achieve ultra-high density recording. Volume holography is now attracting attention. Volume holography is a technique of actively exploiting the height of a recording medium and three-dimensionally writing interference fringes, and is characterized in that the diffraction efficiency is improved by increasing the height of the recording medium and the recording capacity is raised by multiplex recording.

Digital volume holography is a computer-oriented holographic recording method which uses the same recording medium and recording method as with the volume holography, whereas the image information to be recorded is limited to binary digital patterns.

With digital volume holography, image information that may be analog image information is digitized once and developed into two-dimensional pattern information (page data). Then, the two-dimensional digital pattern information is recorded as image information. When reproducing the recorded information, the digital pattern information is read out and decoded to restore and display the original image.

With such an arrangement, the original information can be reproduced highly reliably by means of differential detection and/or encoding of binarized data for error correction if the SN ratio (signal-to-noise ratio) is relatively poor. Angular multiplexing holographic recording apparatus have been proposed as such means for recording/reproducing information. Angular multiplexing holographic recording apparatus employ a technique of slightly changing the angle of the surface of a holographic recording medium relative to reference beam and signal beam at the time of recording so that different pieces of information can be recorded in a same area in a multiplexed manner. "The InPhase Professional Archive Drive OMA: Design and Function" (Reference Document 1) in 2006 Optical Data Storage Topical Meeting Conference Proceedings MA1 page 3 through 5 describes such a conventional technology.

(Conventional Technology 1)

Now, the holographic information recording/reproducing apparatus described in the Reference Document 1 will be summarily described below for the configuration thereof by referring to FIGS. 6 and 7. This apparatus will be referred to as Conventional Technology 1 hereinafter.

Firstly, the holographic information recording/reproducing apparatus that is adapted to use a transmission-type disk will be described for its recording operation by referring to FIG. 6.

The light beam emitted from a light source (semiconductor laser or the like) 101 with a wavelength of 405 nm is turned into a parallel light beam by a collimator 102. Then, the light beam is transmitted through a HWP (half-wave plate) 103 and split into signal beam 122 and recording reference beam 121 by a PBS (polarization beam splitter) 104. The PBS (polarization beam splitter) 104 is a splitter unit for splitting the light beam from the light source into signal beam and reference beam. The direction of polarization of the light beam is adjusted by rotating the HWP (half-wave plate) 103 to change the balance of intensity between signal beam 122 and recording reference beam 121.

Signal beam 122 that is produced by the split is made to pass through a beam expander 105 so as to be expanded to an optimum size relative to SLM (spatial light modulator) 109. Then, the signal beam 122 is transmitted through a phase mask 106 to produce a uniform intensity distribution on Fourier plane, then reflected by a PBS (polarization beam splitter) 108 by way of a relay lens 107 and then guided to SLM (spatial light modulator) 109.

The direction of polarization of the light beam modulated by the SLM (spatial light modulator) 109 and carrying the given information is rotated by n/2 and the light beam is then transmitted through the PBS (polarization beam splitter) 108. The transmitted light beam is then made to enter object lens 114 by way of a polytopic filter 111, a relay lens 112 and a movable HWP (half-wave plate) 113 and converged onto transmission-type disk 119. Note that the direction of polarization of the light beam is not rotated by the HWP (half-wave plate) 113 for recording.

On the other hand, reflectance light for recording 121 is transmitted through the PBS (polarization beam splitter) 104, reflected by mirrors 115 and 116 and then polarized to a desired direction by a galvano mirror 117. Subsequently, the light beam enters a scanner lens 118 and then passes through the recording position of the transmission-type disk 119 regardless of the direction of polarization by the galvano mirror 117. Thus, angular multiplexing recording is realized by changing the angle of incidence of recording reference beam 121 at the recording position of the transmission-type disk 119 by means of rotation of the galvano mirror 117.

Now, the reproducing operation of the holographic information recording/reproducing apparatus will be described by referring to FIG. 7. The light beam emitted from the light source 101 with a wavelength of 405 nm is turned into a parallel light beam by the collimator 102. Then, the light beam is transmitted through the HWP (half-wave plate) 103 and the PBS (polarization beam splitter) 104 without being reflected. At this time, the direction of polarization of the light beam is adjusted by rotating the HWP (half-wave plate) 103 so that no reflected light may be produced by the PBS (polarization beam splitter) 104.

Then, the light beam is reflected by the mirrors 115, 116 and the galvano mirror 117 before the light beam is transmitted through the transmission-type disk 119 by way of the scanner lens 118 and reflected by a rotary fold mirror 120 so as to follow the same light path. Reproduced light 124 of reference beam for reproduction 123 that enters the transmission-type disk 119 from the opposite direction relative to the recording direction is turned into a parallel light beam by the objective lens 114 and the direction of polarization thereof is changed by n/2 by the HWP (half-wave plate) 113.

Unnecessary reproduced light that is reproduced with desired reproduced light simultaneously has a point of convergence different from that of the desired reproduced light in a plane perpendicular to the optical axis between the lenses of the relay lens 112. Thus, unnecessary reproduced light is eliminated by the polytopic filter 111 that transmits only desired reproduced light. Information is reproduced as reproduced light is reflected further by the PBS (polarization beam splitter) 108 and guided to a CMOS (photodetector) 110.

(Conventional Technology 2)

Now, a holographic information recording/reproducing apparatus adapted to use a reflection-type disk that is disclosed in U.S. patent application Ser. No. 11/864,129 will be described by referring to FIGS. 8, 9, 10A and 10B. This apparatus will be referred to as Conventional Technology 2 hereinafter.

Figure 8:
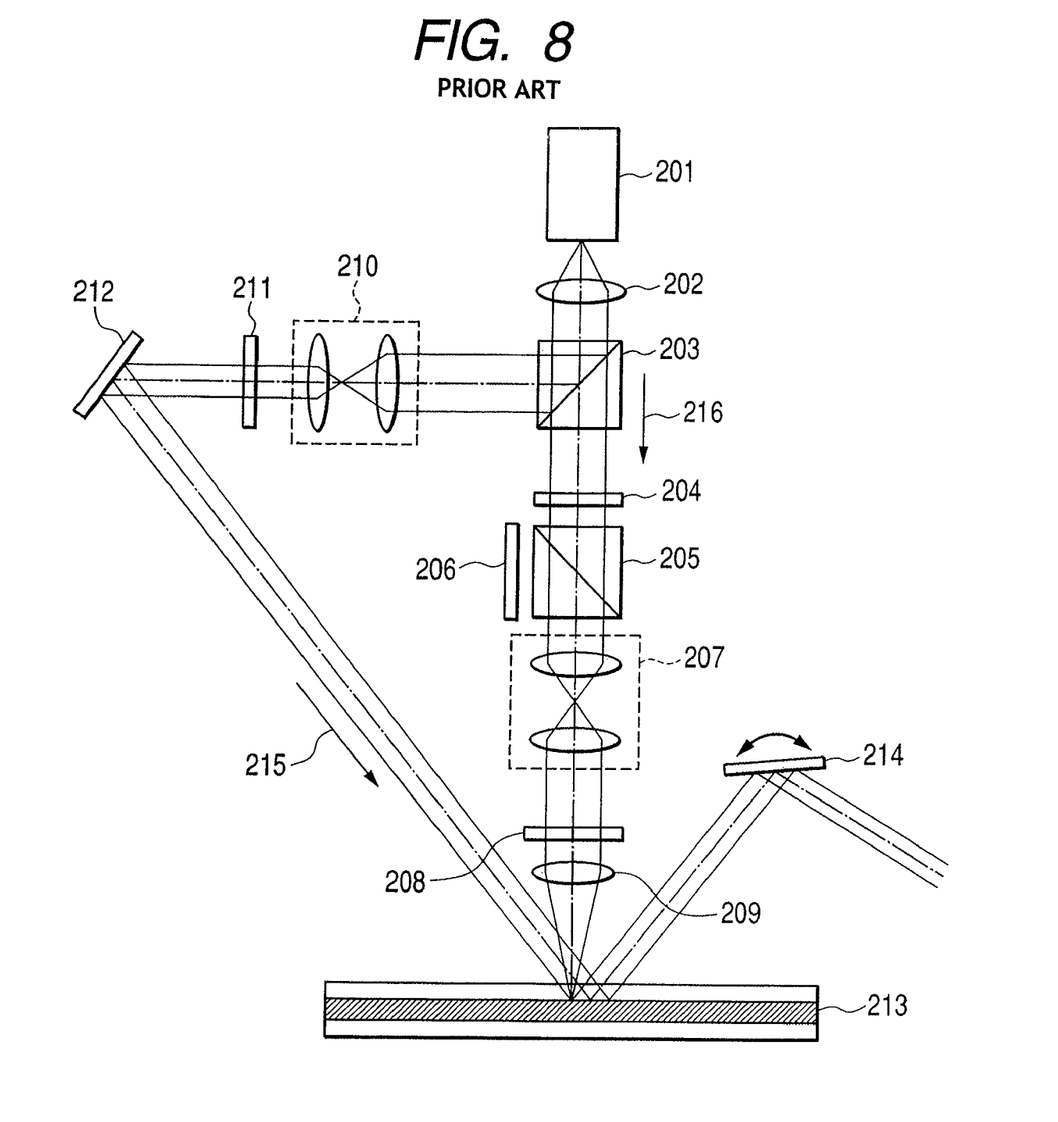
FIG. 8 is a schematic illustration of the optical system for recording of the Conventional Technology 2 that employs a reflection-type disk.
Figure 9:
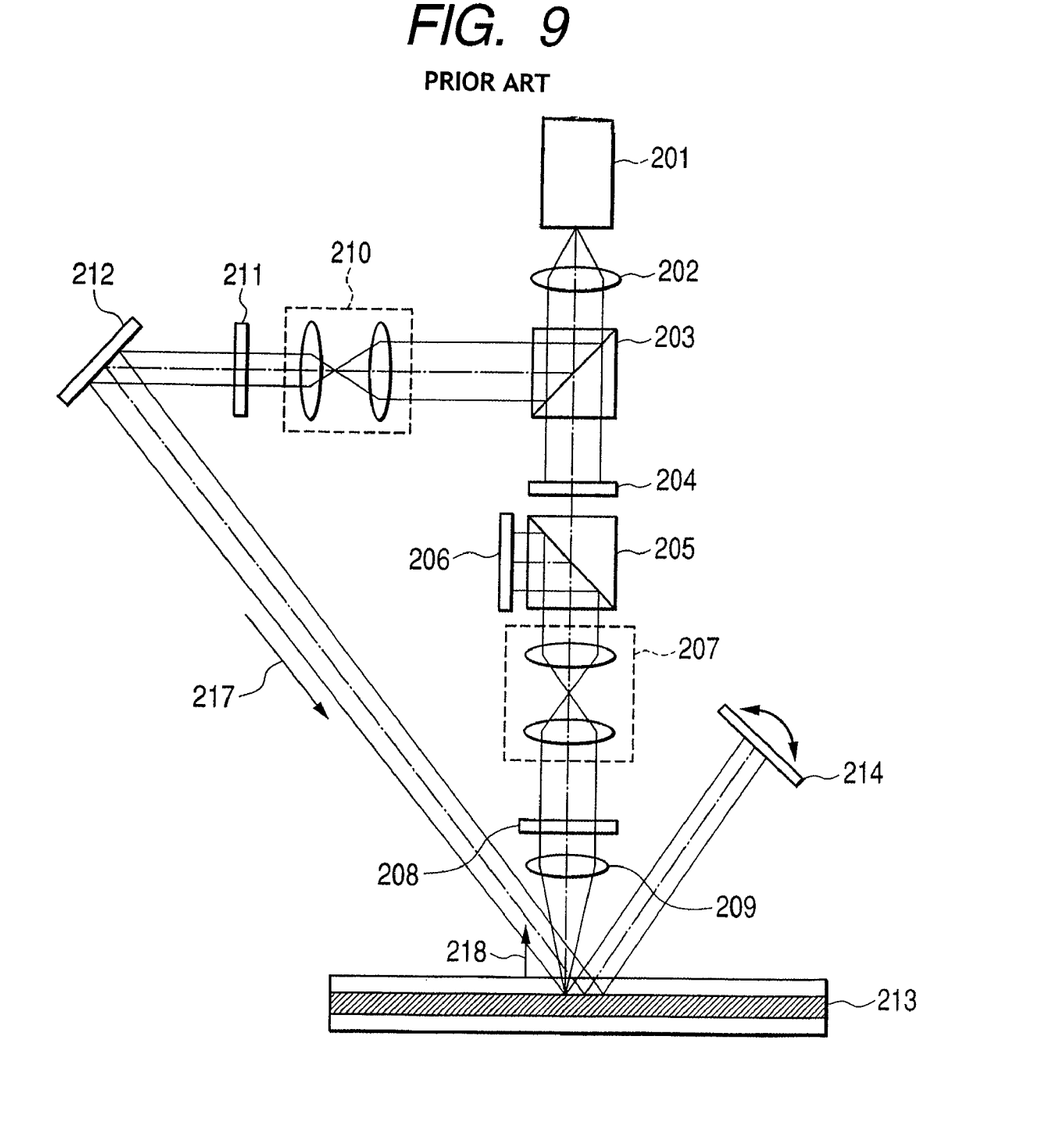
FIG. 9 is a schematic illustration of the optical system for reproduction of the Conventional Technology 2 that employs a reflection-type disk.
Figure 10A:
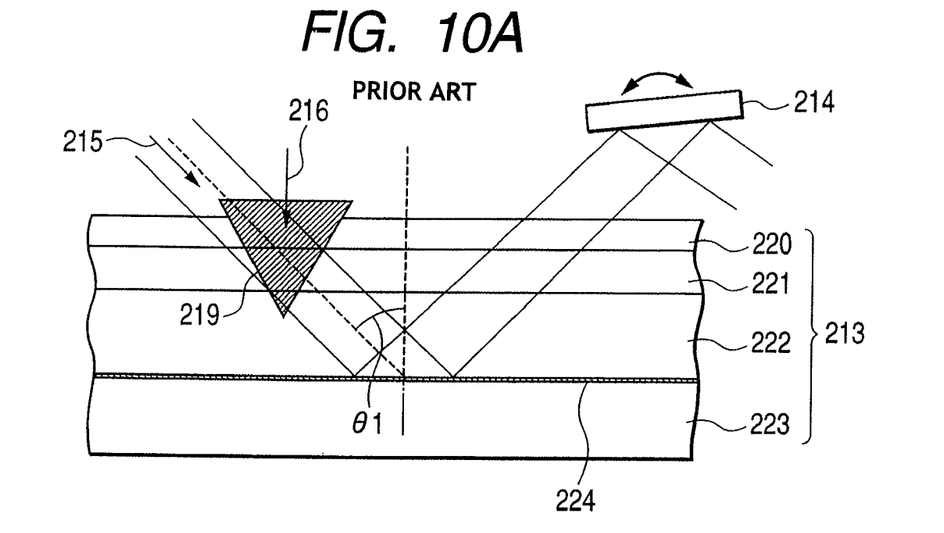
FIGS. 10A and 10B are schematic illustrations of the light beams entering and coming out from a reflection-type disk employed by the Conventional Technology 2 for recording and reproduction respectively.
Figure 10B:
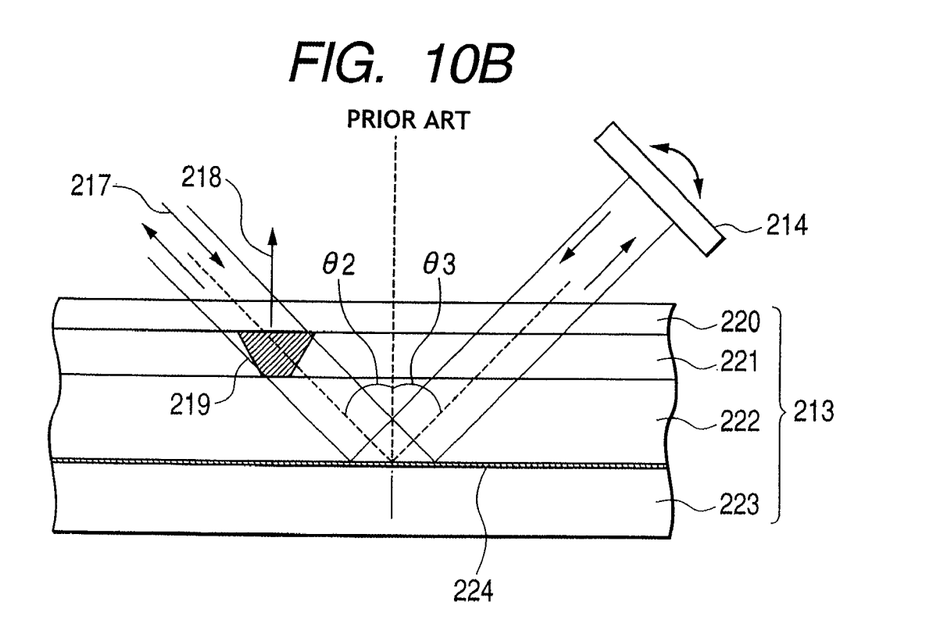

FIG. 8 schematically illustrates the optical system for recording and FIG. 9 schematically illustrates the optical system for reproduction of the Conventional Technology 2. FIGS. 10A and 10B respectively illustrate in detail a light beam striking a reflection-type disk 213 when recording information illustrated in FIG. 8 and a light beam going out from a reflection-type disk 213 when reproducing information illustrated in FIG. 9.

Firstly, the recording operation of the apparatus will be described by referring to FIG. 8. The light beam emitted from a light source (semiconductor laser or the like) 201 with a wavelength of 405 nm is turned into a parallel light beam by a collimator 202 and made to strike a PBS (polarization beam splitter) 203. Then, the light beam is split into signal beam 216 and recording reference beam 215 by the PBS (polarization beam splitter) 203. The PBS (polarization beam splitter) 203 is a splitter unit for splitting the light beam from the light source into signal beam and reference beam. Signal beam 216 produced by the split is transmitted through the PBS (polarization beam splitter) 203 and irradiates an SLM (spatial light modulator) 204.

Then, signal beam 216 is transmitted through the SLM (polarization beam splitter) 204 and then PBS (spatial light modulator) 205 and strikes QWP (quarter-wave plate) 208 by way of a relay lens 207. After being transmitted through the QWP (quarter-wave plate) 208, signal beam 216 is transformed into circular polarized light and made to strike an objective lens 209 so as to be irradiated onto a reflection-type disk 213 as signal beam 216 by the objective lens 209.

Recording reference beam 215 that is reflected by the PBS (polarization beam splitter) 203 strikes a QWP (quarter-wave plate) 211 by way of a relay lens 210. After being transmitted through the QWP (quarter-wave plate) 211, the light beam is transformed into circular polarized light and reflected by a mirror 212 so as to be irradiated onto the reflection-type disk 213 as recording reference beam.

As illustrated in FIG. 10A, the reflection-type disk 213 has a cover layer 220, a recording layer 221, a space layer 222 and a substrate 223, the surface of which forms a reflection plane 224. For recording, signal beam 216 is transmitted through the cover layer 220 in the reflection-type disk 213 and enters the recording layer 221. At this time, recording reference beam 215 is made to enter the reflection-type disk 213 from the upper left as illustrated in FIG. 10A and transmitted through the cover layer 220, the recording layer 221 and the space layer 222 to get to the reflection plane 224.

Assume that the angle of incidence is $\theta 1$. Then, the signal beam 216 and the recording reference beam 215 interfere with each other in the recording layer 221 to form interference fringes 218 (219?) and record information. On the other hand, the recording reference beam 215 that is reflected by the reflection plane 224 is transmitted through the space layer 222, the recording layer 221 and the cover layer 220 to leave the reflection-type disk 213. After leaving the reflection-type disk 213, the recording reference beam 215 enters a galvano mirror 214. The angle of the galvano mirror 214 is adjusted such that recording reference beam 215 is controlled so as not to reenter the reflection-type disk 213.

Now, the reproducing operation of the holographic information recording/reproducing apparatus will be described by referring to FIGS. 9 and 10B. Referring to FIG. 9, the light beam emitted from the light source 201 with a wavelength of 405 nm is turned into a parallel light beam by the collimator 202 and made to enter the PBS (polarization beam splitter) 203. Light that enters the PBS (polarization beam splitter) 203 is partly transmitted and partly reflected. Then, the reflected light enters the QWP (quarter-wave plate) 211 by way of the relay lens 210. The light beam transmitted through the QWP (quarter-wave plate) 211 is transformed into circular polarized light and reflected by the mirror 212 so as to be irradiated onto the reflection-type disk 213 as readout reference beam 217.

As illustrated in FIG. 10B, the readout reference beam 217 is made to enter the reflection-type disk 213 from left above and transmitted through the cover layer 220, the recording layer 221 and the space layer 222 to get to the reflection plane 224. Assume that the angle of incidence is $\theta 2$. After being reflected by the reflection plane 224, the readout reference beam 217 is transmitted through the space layer 222, the recording layer 221 and the cover layer 220 to leave the reflection-type disk 213. After leaving the reflection-type disk 213, the light is reflected by the galvano mirror 214 and strikes the reflection-type disk 213 once again.

Assume that the angle of incidence of reentering light is $\theta 3$. Reproduced light 218 goes out as the readout reference beam 217 is reflected again by the reflection plane 224 and irradiated onto the interference fringes 219 that carry recorded information. The reproduced light 218 that goes out from the reflection-type disk 213 is transmitted through the objective lens 209 and the QWP (quarter-wave plate) 208 to become circular polarized light and enters the PBS (polarization beam splitter) 205 by way of the relay lens 207. The reproduced light 218 that is reflected by the PBS (polarization beam splitter) 205 forms an image on a CMOS (photodetector) 206 to reproduce information.

Note that light transmitted through the PBS (polarization beam splitter) 203 is prevented from being transmitted through the PBS (polarization beam splitter) 205 and getting to the reflection-type disk 213 by way of the objective lens 209 at the time of reproduction. More specifically, a shutter (not illustrated) is arranged between the PBS (polarization beam splitter) 203, the SLM (spatial light modulator) 204 and the PBS (polarization beam splitter) 205 to block the light path and stop light. Anything other than a shutter that can stop light may alternatively be used.

When a transmission-type disk is used with the Conventional Technology 1, the angle of incidence $\theta 1$ relative to the transmission-type disk of reference beam reflected by the galvano mirror 117 that operates as first deflector unit at the time of recording is equal to the angle of incidence $\theta 2$ relative to the transmission-type disk of reference beam reflected by the first deflector unit at the time of reproduction.

Similarly, the angle of incidence $\theta 3$ relative to the transmission-type disk of reference beam coming out from the transmission-type disk and made to reenter the transmission-type disk by the galvano mirror 120 that operates as second deflector unit is equal to the angle of incidence $\theta 1$.

Thus, the optical axis of reference beam entering the transmission-type disk and the optical axis of reference beam reentering the transmission-type disk agree with each other at the time of reproduction to give rise to stray light and aggravate the SN (signal to noise) ratio when reference beam is transmitted through the transmission-type disk.

When, on the other hand, a reflection-type disk is used with the Conventional Technology 2, the angle of incidence θ1 relative to the reflection-type disk of reference beam reflected by the mirror 212 that operates as first deflector unit at the time of recording is equal to the angle of incidence θ2 relative to the reflection-type disk of reference beam reflected by the first deflector unit at the time of reproduction. (See FIGS. 10A and 10B.)

Similarly, the angle of incidence θ3 relative to the reflection-type disk of reference beam coming out from the reflection-type disk and made to reenter the reflection-type disk by the galvano mirror 214 that operates as second deflector unit is equal to the angle of incidence θ1. (See FIGS. 10A and 10B.)

Thus, there arises a problem that the angle of incidence θ2 of reference beam entering the reflection-type disk at the time of reproduction is equal to the angle of incidence θ3 of reference beam reentering the reflection-type disk to give rise to stray light and aggravate the SN (signal to noise) ratio.

SUMMARY OF THE INVENTION

Therefore, the object of the present invention is to provide an information recording/reproducing apparatus that can suppress generation of stray light and prevent aggravation of the SN (signal to noise) ratio at the time of reproduction.

Specifically, there are provided as follows. There is provided a holographic information recording/reproducing apparatus including: a light source; a splitter unit that splits a light beam from the light source into a first light beam and a second light beam; a spatial light modulator that makes the first light beam bear information; a first galvano mirror that reflects the second light beam toward an information recording medium; a second galvano mirror that makes the second light beam coming out from the information recording medium reenter the information recording medium; and a controller that controls the angle of the first galvano mirror and/or that of the second galvano mirror, wherein the controller controls the first galvano mirror and the second galvano mirror so as to establish relationships of θ1≠θ2 and θ1=θ3, where θ1 s the angle of incidence of the second light beam entering the information recording medium at the time of recording; θ2 is the angle of incidence of the second light beam entering the information recording medium at the time of reproduction; and θ3 is the angle of incidence of the second light beam reentering the information recording medium at the time of reproduction.

With the above-described arrangement, reference beam entering the information recording medium is displaced from reference beam reentering the information recording medium to suppress generation of stray light at the time of reproduction.

Further features of the present invention will become apparent from the following description of exemplary embodiments with reference to the attached drawings.

DESCRIPTION OF THE EMBODIMENTS

Now, exemplary embodiments of the present invention will be described in detail by referring to the accompanying drawings. A holographic information recording/reproducing apparatus according to the present invention includes a semiconductor laser (which corresponds to the light sources 101 and 201) that operates as light source and a splitter unit (which corresponds to polarization beam splitters 104 and 203) for splitting the light beam from the light source into signal beam and reference beam. The holographic information recording/reproducing apparatus also has a first deflector unit (which corresponds to the galvano mirrors 117 and 212) for reflecting reference beam toward a transmission-type disk 119 or a reflection-type disk 213, which is an information recording medium and a second deflector unit (which corresponds to the galvano mirror 120 and the galvano mirror 214) for making reference beam coming out from the information recording medium reenter the information recording medium.

According to the present invention, information is recorded by causing signal beam and reference beam to interfere with each other in the information recording medium and information is reproduced by causing reference beam to enter the information recording medium by means of the first deflector unit and to reenter reflected reference beam into the information recording medium by means of the second deflector unit.

Firstly assume that the angle of incidence of reference beam relative to the information recording medium at the time of recording is θ1, the angle of incidence of reference beam relative to the information recording medium at the time of reproduction is θ2 and the angle of incidence of reference beam reentering the information recording medium relative to the information recording medium at the time of reproduction is θ3. The present invention is characterized in that the invention has a control unit that controls the first and second deflector units so as to establish relationships of θ1≠θ2 and θ1=θ3.

First Embodiment

Figure 1:
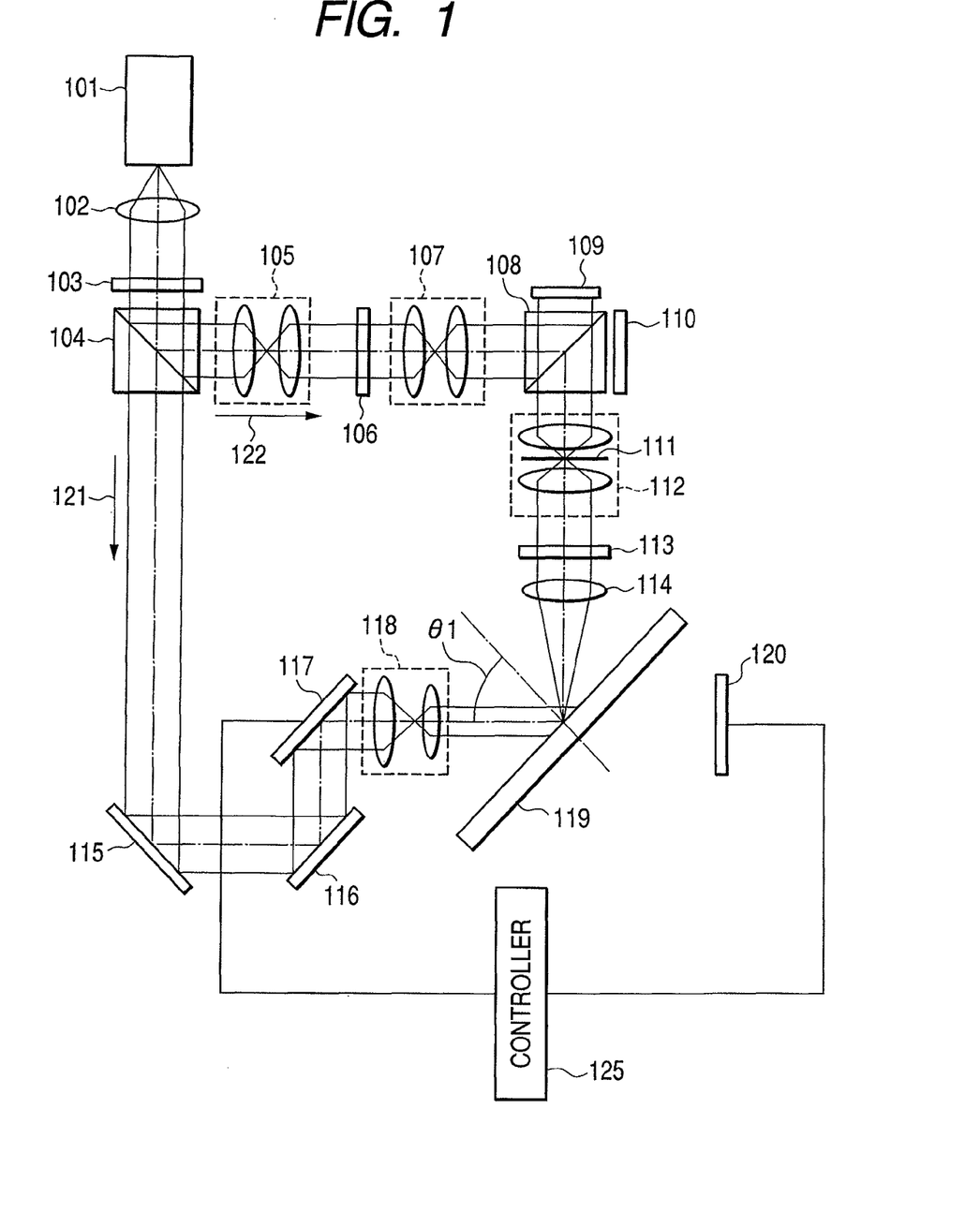
FIG. 1 is a schematic illustration of the first embodiment of information recording/reproducing apparatus (for a transmission-type disk) according to the present invention, illustrating the configuration thereof for recording.
Figure 2:
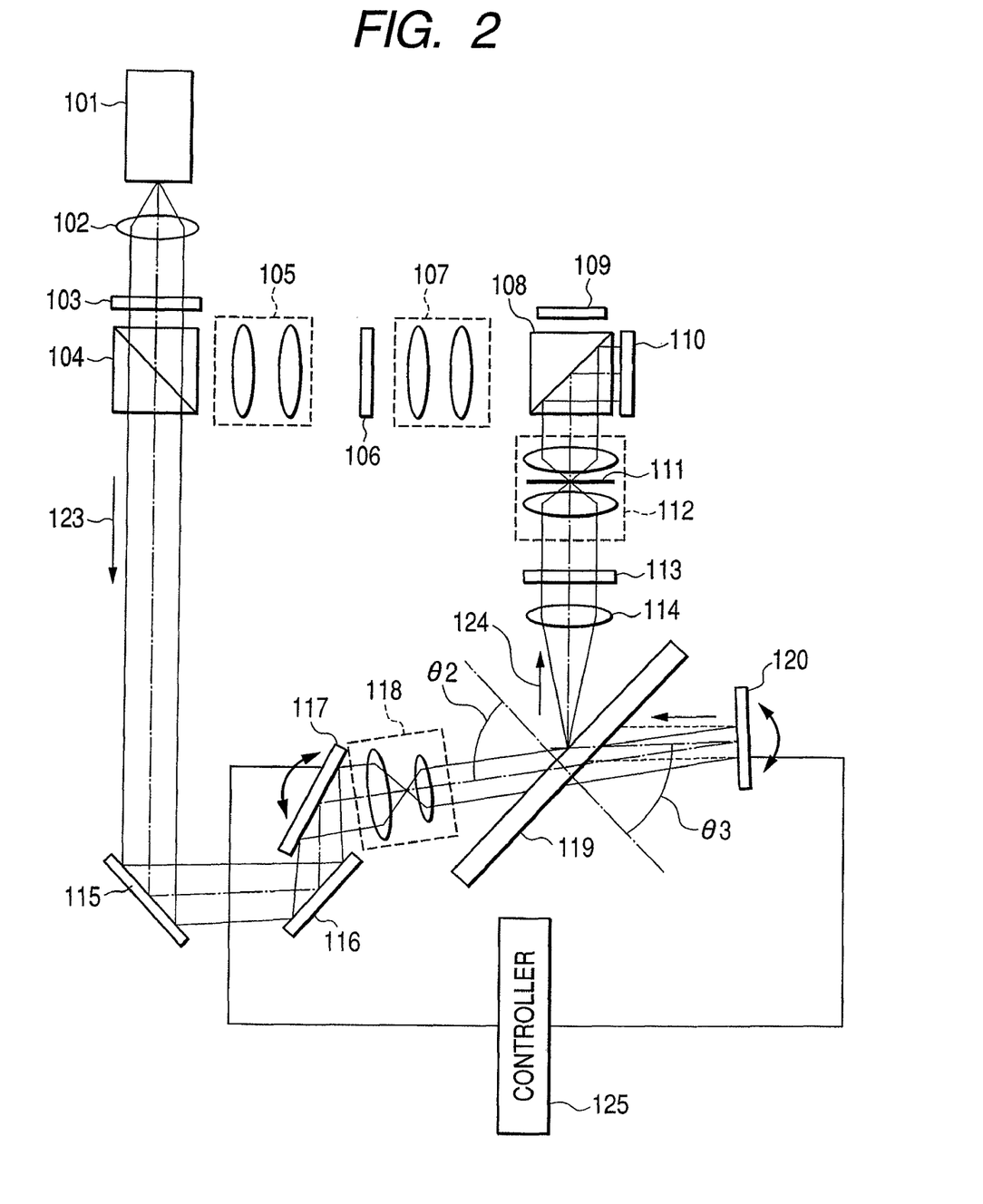
FIG. 2 is a schematic illustration of the first embodiment of the information recording/reproducing apparatus, illustrating the configuration thereof for reproduction.

Now, the first embodiment of the present invention will be described by referring to FIGS. 1 and 2. This embodiment is adapted to operate with a transmission-type disk that is an information recording medium. FIG. 1 schematically illustrates the configuration of the optical system of the embodiment for recording information while FIG. 2 schematically illustrates the configuration of the optical system of the embodiment for reproducing information. Note that FIGS. 1 and 2 mainly illustrate the configurations of the optical systems and the circuit for recording information, the circuit for reproducing information, the circuit for servo control, the control circuit for controlling the components of the apparatus and the circuit and the mechanism for driving the disk are omitted.

Figure 6:
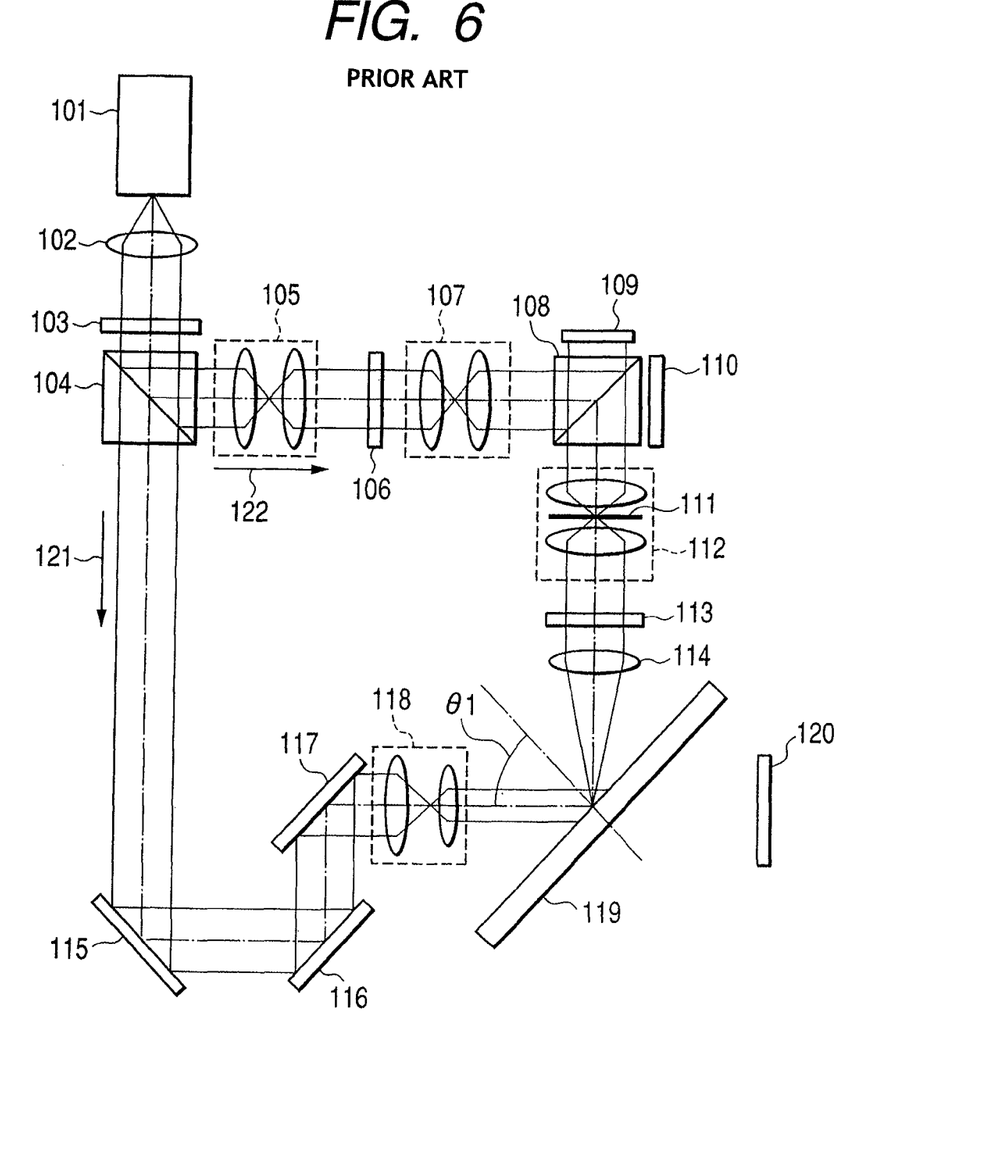
FIG. 6 is a schematic illustration of the optical system for recording of the Conventional Technology 1 that employs a transmission-type disk.
Figure 7:
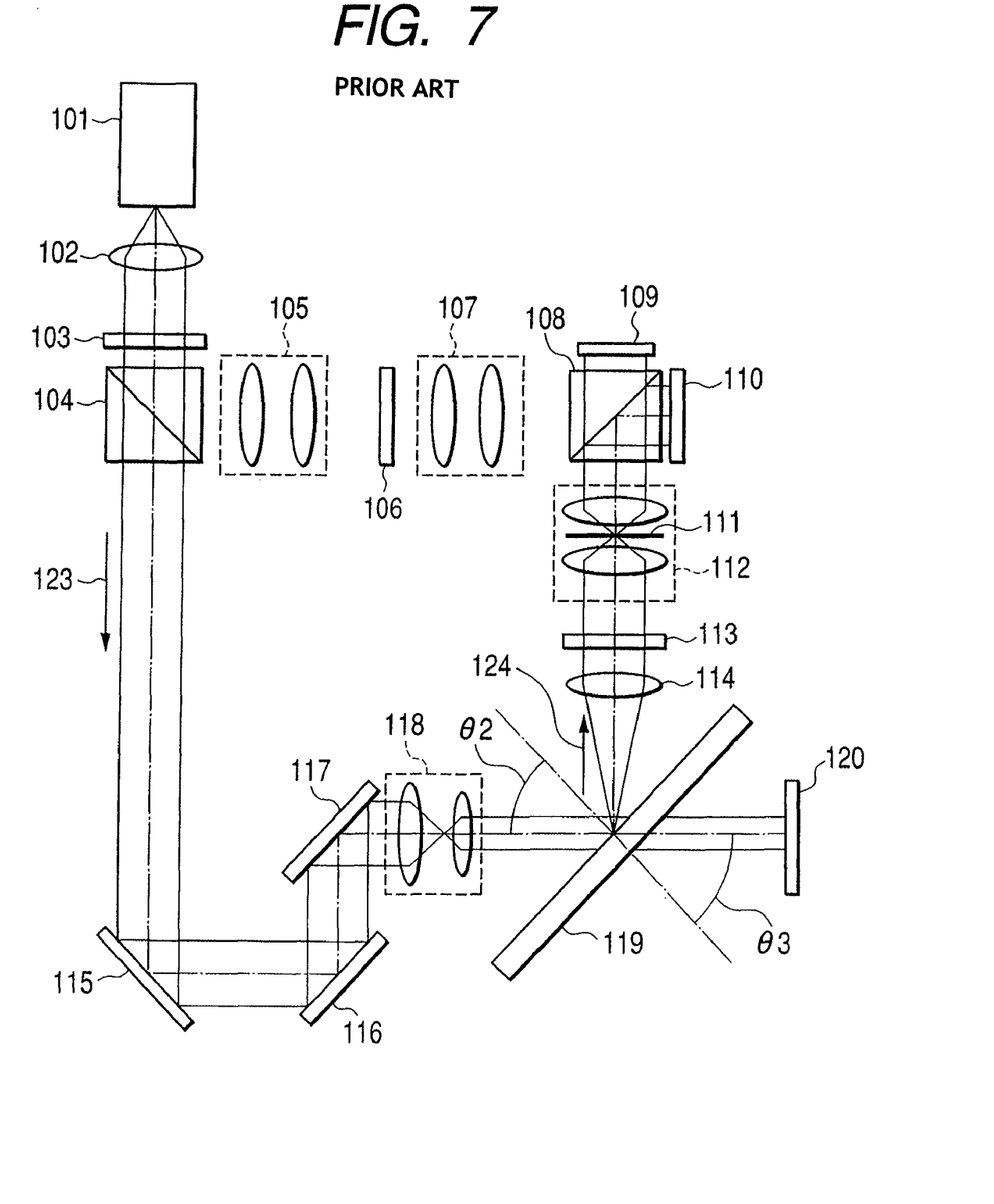
FIG. 7 is a schematic illustration of the optical system for reproduction of the Conventional Technology 1 that employs a transmission-type disk.

The configuration and operation for recording information and those for reproducing information of this embodiment are similar to those of the Conventional Technology 1 illustrated in FIGS. 6 and 7. Therefore, the components in FIGS. 1 and 2 that are same as their counterparts of FIGS. 6 and 7 are denoted by the same reference symbols respectively and will not be described any further.

This embodiment is adapted to control the galvano mirror 117 so as to make the angle of incidence θ2 of readout reference beam 123 relative to the transmission-type disk 119 that appears at the time of reproduction differs from the angle of incidence θ1 of recording reference beam 121 relative to the transmission-type disk 119 that appears at the time recording, or make the relationship of θ1≠θ2 hold true. The galvano mirror 117 operates as first deflector unit.

More specifically, the galvano mirror 117 is made to take the attitude as illustrated in FIG. 1 at the time of recording but the galvano mirror 117 is rotated in the sense of arrow as illustrated in FIG. 2 by a drive unit for driving the galvano mirror 117 to rotate typically by the drive force of a motor (not illustrated) so as to change the angle of incidence θ2 at the time of reproduction and establish the relationship of θ1≠θ2. The drive unit is controlled by a controller 125. The controller 125 controls the object of control by means of a CPU.

The angle of incidence of readout reference beam 123 reflected by the galvano mirror 120 at the time of reproduction and made to reenter the transmission-type disk 119 from the side opposite to the side where the reference beam enters at the time of recording is θ3. The galvano mirror 120 is controlled so as to make the angle of incidence θ3 equal to the angle of incidence θ1 of recording reference beam 121 relative to the transmission-type disk 119 at the time of recording, or establish the relationship of θ1=θ3. The galvano mirror 120 operates as the second deflector unit.

More specifically, the galvano mirror 120 is made to take the attitude as illustrated in FIG. 1 at the time of recording but the galvano mirror 120 is rotated in the sense of arrow as illustrated in FIG. 2 by a drive unit for driving the galvano mirror 120 to rotate typically by the drive force of a motor (not illustrated) at the time of reproduction so as to establish the relationships of θ1=θ3 and θ1≠θ2 simultaneously. The drive unit is controlled by the controller 125.

Thus, the angle of incidence θ1 of reference beam made to enter the transmission-type disk 119 by the galvano mirror 117 at the time of recording and the angle of incidence θ3 of reference beam made to reenter the transmission-type disk 119 by the galvano mirror 120 at the time of reproduction need to satisfy the relationship of θ1=θ3. Reproduced light 124 can come out of the transmission-type disk 119 and information can be reproduced when the relationship of θ1=θ3 is satisfied.

The fact that the relationship of θ1≠θ2 is satisfied simultaneously means that the angle of incidence θ2 of reference beam made to enter the transmission-type disk 119 by the galvano mirror 117 differs from the angle of incidence θ3 of reference beam made to reenter the transmission-type disk 119 by the galvano mirror 120 at the time of reproduction.

In other words, as seen from FIG. 2, the optical axis of reference beam made to enter the transmission-type disk 119 by the galvano mirror 117 is displaced from the optical axis of reference beam made to reenter the transmission-type disk 119. Thus, generation of stray light is suppressed and the SN (signal to noise) ratio is prevented from aggravation at the time of reproduction.

Note that the angles of incidence θ1 through θ3 are expressed as the angles of the light beams relative to an axis perpendicular to the recording surface of the transmission-type disk 119. However, they may alternatively be expressed as the angles of light beams relative to the recording surface of the transmission-type disk 119.

Second Embodiment

Figure 3:
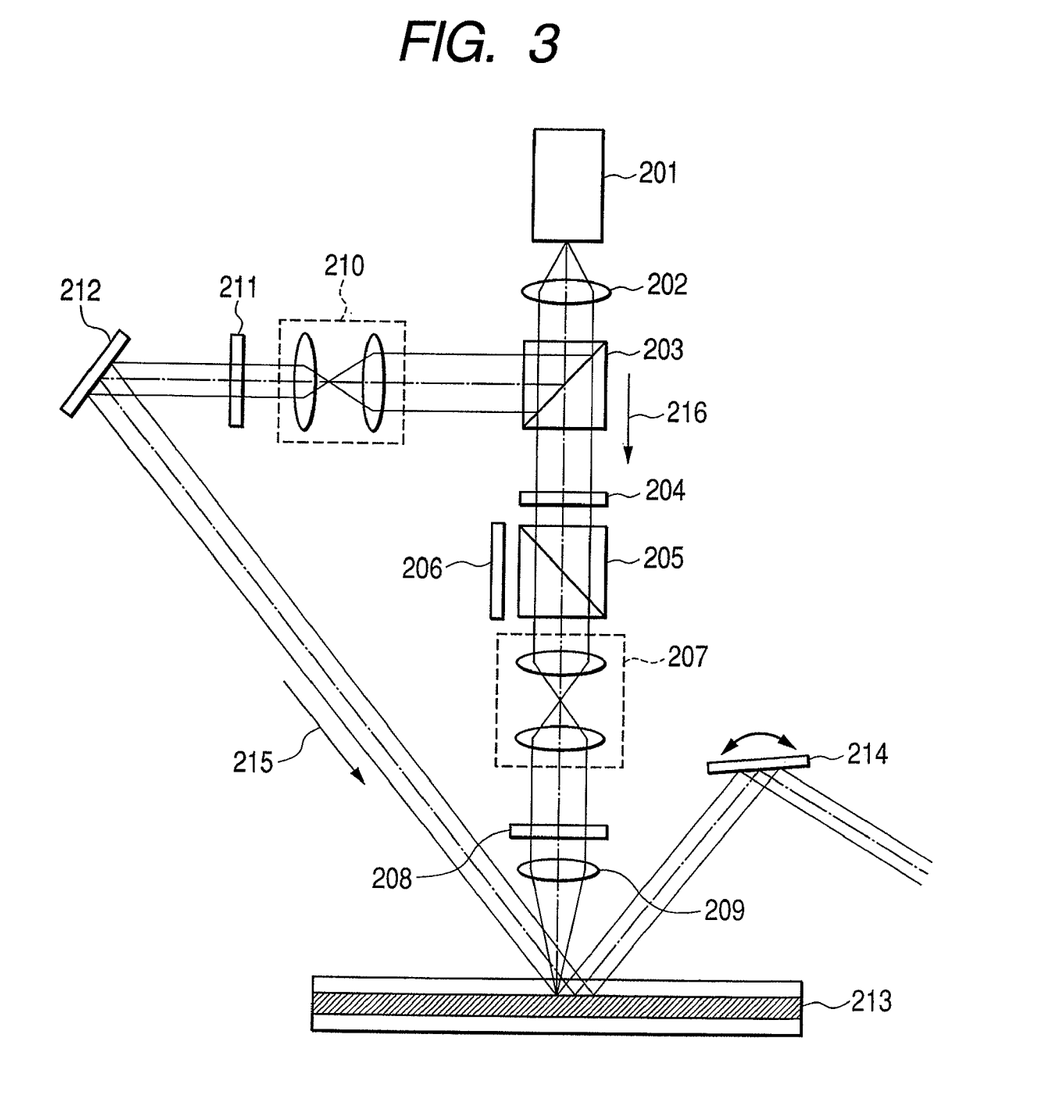
FIG. 3 is a schematic illustration of the second embodiment of information recording/reproducing apparatus (for a reflection-type disk) according to the present invention, illustrating the configuration thereof for recording.
Figure 4:
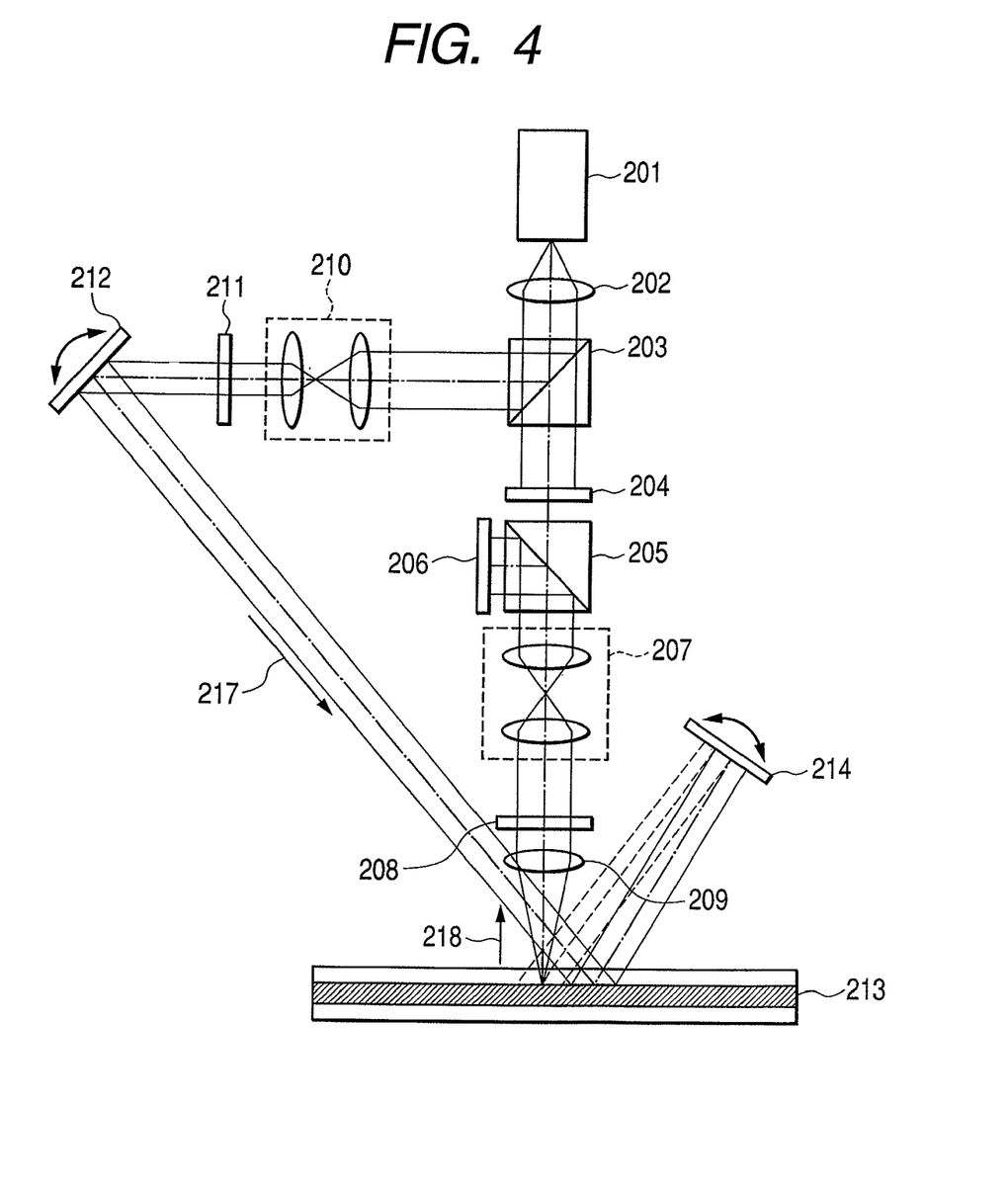
FIG. 4 is a schematic illustration of the second embodiment of the information recording/reproducing apparatus, illustrating the configuration thereof for reproduction.
Figure 5A:
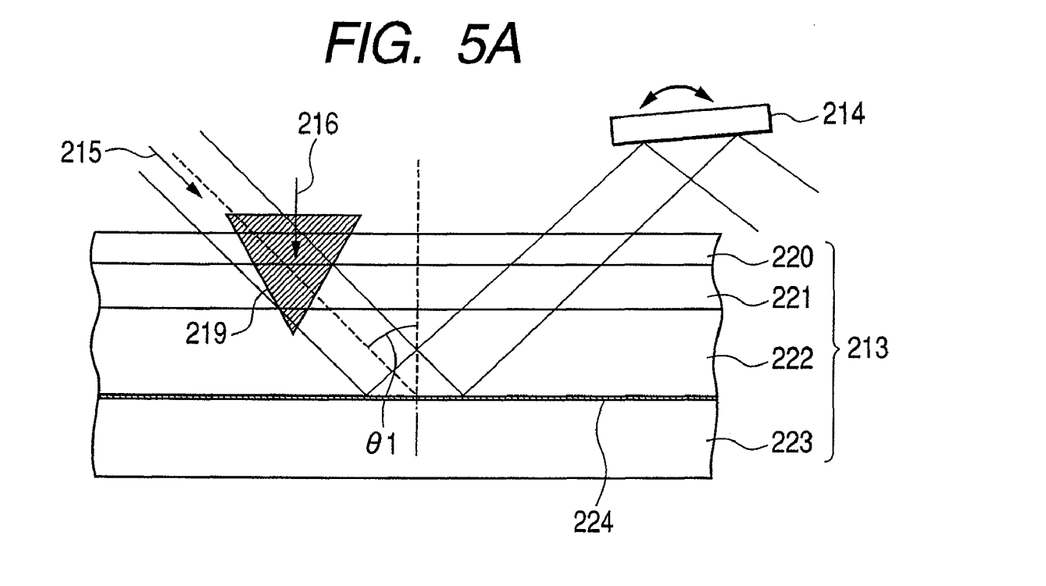
FIGS. 5A and 5B are schematic illustrations of the light beam entering and coming out from a reflection-type disk for recording and reproduction respectively.

Now, the second embodiment of the present invention will be described by referring to FIGS. 3, 4, 5A and 5B. This embodiment is adapted to operate with a reflection-type disk that is an information recording medium. FIG. 3 schematically illustrates the configuration of the optical system of the embodiment for recording information while FIG. 4 schematically illustrates the configuration of the optical system of the embodiment for reproducing information. FIG. 5A illustrates in detail the light beam of FIG. 3 entering and coming out from the reflection-type disk 213 for recording information, whereas FIG. 5B illustrates in detail the light beam of FIG. 4 entering and coming out from the reflection-type disk 213 for reproducing information.

The basic configuration and the basic operation of this embodiment are similar to those of the Conventional Technology 2 illustrated in FIGS. 8, 9, 10A and 10B. Therefore, the components in FIGS. 3, 4, 5A and 5B that are same as their counterparts of FIGS. 8, 9, 10A and 10B are denoted by the same reference symbols respectively and will not be described any further. Note that FIGS. 3 and 4 mainly illustrate the configurations of the optical systems and the circuit for recording information, the circuit for reproducing information, the circuit for servo control, the control circuit for controlling the components of the apparatus and the circuit and the mechanism for driving the disk are omitted.

Figure 5B:
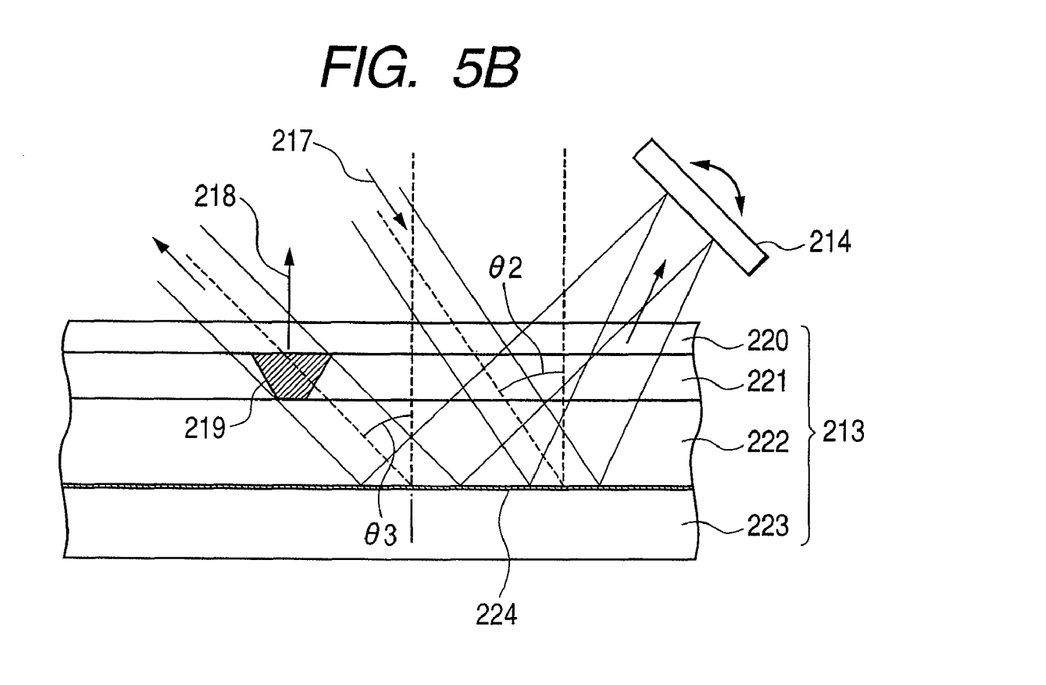

This embodiment is adapted to control the mirror 212 so as to make the angle of incidence θ2 of readout reference beam 217 relative to the reflection-type disk 213 at the time of reproduction as illustrated in FIG. 5B differ from the angle of incidence θ1 of recording reference beam 215 relative to the reflection-type disk 213 at the time of recording as illustrated in FIG. 5A. In other words, the mirror 212 is so controlled as to make the relationship of θ1≠θ2 hold true. The mirror 212 operates as first deflector unit.

More specifically, the mirror 212 is made to take the attitude as illustrated in FIG. 3 at the time of recording but the mirror 212 is rotated in the sense of arrow as illustrated in FIG. 4 by a drive unit for driving the mirror 212 to rotate typically by the drive force of a motor (not illustrated) at the time of reproduction so as to establish the relationship of θ1≠θ2. The drive unit is controlled by a controller as in the case of FIGS. 1 and 2.

At the time of reproduction, the reference beam 217 for reproduction that is reflected by the reflection plane 224 is transmitted through the space layer 222, the recording layer 221 and the cover layer 220 to enter the galvano mirror 214 as illustrated in FIG. 5B. At this time, the galvano mirror 214 is controlled so as to make the angle of incidence θ3 of reference beam that is made to reenter the reflection-type disk 213 by the galvano mirror 214 as illustrated in FIG. 5B equal to the angle of incidence θ1 of recording reference beam 215 relative to the reflection-type disk 213 as illustrated in FIG. 5A and hence make the relationship of θ1≠θ2 hold true. The galvano mirror 214 operates as second deflector unit.

More specifically, the galvano mirror 214 is made to take the attitude as illustrated in FIG. 3 at the time of recording but the galvano mirror 214 is rotated in the sense of arrow as illustrated in FIG. 4 by a drive unit for driving the galvano mirror 214 to rotate typically by the drive force of a motor (not illustrated) so as to establish the relationships of θ1=θ3 and θ1≠θ2 simultaneously. The drive unit is controlled by a controller as in the case of FIGS. 1 and 2.

Thus, the angle of incidence θ1 of reference beam made to enter the reflection-type disk 213 by the mirror 212 at the time of recording and the angle of incidence θ3 of reference beam made to reenter the reflection type disk 213 by the galvano mirror 214 at the time of reproduction satisfy the relationship of θ1=θ3. Reproduced light 218 can come out of the reflection-type disk 213 and information can be reproduced when the relationship of θ1=θ3 is satisfied.

The fact that the relationship of θ1≠θ2 is satisfied simultaneously means that the angle of incidence θ2 of reference beam made to enter the reflection-type disk 213 by the mirror 212 at the time of reproduction differs from the angle of incidence θ3 of reference beam made to reenter the reflection-type disk 213 by the galvano mirror 214 at the time of reproduction.

In other words, as seen from FIG. 5B, the optical axis of reference beam made to enter the reflection-type disk 213 by the mirror 212 is displaced from the optical axis of reference beam made to reenter the reflection-type disk 213 by the galvano mirror 214. Thus, generation of stray light is suppressed and the SN (signal to noise) ratio is prevented from aggravation at the time of reproduction.

Note that, in this embodiment, the angles of incidence θ1 through θ3 are expressed as the angles of the light beams relative to an axis perpendicular to the recording surface of the reflection-type disk 213. However, the angles of incidence θ1 through θ3 may alternatively be expressed as the angles of light beams relative to the recording surface of the reflection-type disk 213.

Thus, according to the present invention, generation of stray light is suppressed and the SN (signal to noise) ratio is prevented from aggravation at the time of reproduction regardless if the recording medium employed by a holographic information recording/reproducing apparatus is a transmission-type recording medium or a reflection-type recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-024496, filed Feb. 2, 2007, which is hereby incorporated by reference in its entirety.

What is claimed is:

1. A holographic information recording/reproducing apparatus comprising:
a light source;
a splitter unit that splits a light beam from the light source into a first light beam and a second light beam;
a spatial light modulator that makes the first light beam bear information;
a first galvano mirror that reflects the second light beam toward an information recording medium;
a second galvano mirror that makes the second light beam coming out from the information recording medium reenter the information recording medium; and
a controller that controls the angle of the first galvano mirror and that of the second galvano mirror,
wherein the controller controls the first galvano mirror and the second galvano mirror so as to establish relationships of θ1≠θ2 and θ1=θ3, where
θ1 is the angle of incidence of the second light beam entering the information recording medium at the time of recording;
θ2 is the angle of incidence of the second light beam entering the information recording medium at the time of reproduction; and
θ3 is the angle of incidence of the second light beam reentering the information recording medium at the time of reproduction.

2. The holographic information recording/reproducing apparatus according to claim 1, wherein the information recording medium is a transmission recording medium.

3. The holographic information recording/reproducing apparatus according to claim 1, wherein the information recording medium is a reflection recording medium.

* * * * *